US012087532B2

(12) United States Patent
Xiao et al.

(10) Patent No.: US 12,087,532 B2
(45) Date of Patent: Sep. 10, 2024

(54) MOVABLE CONTACT BRACKET ASSEMBLY AND CONTACTOR

(71) Applicant: Schneider Electric Industries SAS, Rueil-Malmaison (FR)

(72) Inventors: Jiaren Xiao, Shanghai (CN); Yuanzhong Wang, Shanghai (CN); Zhen Li, Shanghai (CN); Zezhen Yang, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 18/091,600

(22) Filed: Dec. 30, 2022

(65) Prior Publication Data

US 2023/0215674 A1 Jul. 6, 2023

(30) Foreign Application Priority Data

Dec. 31, 2021 (CN) ........................ 202123409585.7

(51) Int. Cl.

*H01H 50/60* (2006.01)
*H01H 1/18* (2006.01)
*H01H 73/18* (2006.01)

(52) U.S. Cl.

CPC .............. *H01H 50/60* (2013.01); *H01H 1/18* (2013.01); *H01H 73/18* (2013.01)

(58) Field of Classification Search

None
See application file for complete search history.

(56) References Cited

U.S. PATENT DOCUMENTS 3,705,144 A * 12/1972 Genequand ............ H01H 33/66 218/123
3,959,616 A 5/1976 Swanson et al.
10,490,380 B2 * 11/2019 Yao .................... H01H 85/2045
2012/0313737 A1 * 12/2012 Iwamoto ................ H01H 51/06 335/185

FOREIGN PATENT DOCUMENTS

CN 113035648 A 6/2021
EP 3142133 A1 3/2017
EP 3879553 A1 9/2021

OTHER PUBLICATIONS

Extended European Search Report dated May 23, 2023 for corresponding European Patent Application No. 22307055.8-1201, 10 pages.

* cited by examiner

*Primary Examiner* — Bernard Rojas
(74) *Attorney, Agent, or Firm* — Locke Lord LLP

(57) ABSTRACT

The present disclosure relates to a movable contact bracket assembly and a contactor, the movable contact bracket assembly includes a movable contact and a movable contact bracket, the movable contact bracket assembly further includes a magnetic conductive frame, the magnetic conductive frame is configured to at least partially surround the movable contact to protect the movable contact from arc erosion.

7 Claims, 3 Drawing Sheets

MOVABLE CONTACT BRACKET ASSEMBLY AND CONTACTOR

TECHNICAL FIELD

The present disclosure relates to a movable contact bracket assembly, which includes a movable contact and a movable contact bracket. The present disclosure also provides a contactor, which includes the movable contact bracket assembly as described above.

BACKGROUND

In an existing movable contact bracket assembly, the movable contact is vulnerable to arc erosion, and the arc generated upon the movable contact and the stationary contact being separated is sometimes difficult to be guided to an arc extinguishing device, which has the problem of arc stagnation. In addition, during the movement of the movable contact, due to the lack of guidance, the movable contact may not be aligned with the stationary contact, resulting in safety problems.

SUMMARY

Therefore, an purpose of the present disclosure provides a movable contact bracket assembly, which includes a movable contact and a movable contact bracket; the movable contact bracket assembly further includes a magnetic conductive frame, the magnetic conductive frame is configured to at least partially surround the movable contact to protect the movable contact from arc erosion.

Favorably, a contour of the magnetic conductive frame is configured to match a contour of the movable contact to at least partially surround the movable contact.

Favorably, the magnetic conductive frame includes an opening, and a contact of the movable contact extends through the opening by a predetermined distance, and the predetermined distance is selected to facilitate guiding an arc generated upon the movable contact and the stationary contact being separated from each other from the movable contact to the magnetic conductive frame.

Favorably, the magnetic conductive frame completely surrounds all portions except the contact of the movable contact.

Favorably, the magnetic conductive frame includes a notch to reduce a weight of the magnetic conductive frame.

Favorably, the magnetic conductive frame includes a first through hole, the movable contact includes a second through hole, and a guide shaft passes through the first through hole and the second through hole to connect the magnetic conductive frame and the movable contact.

Favorably, the movable contact bracket includes a guide groove along which the guide shaft can move.

Favorably, the movable contact bracket assembly further includes a heat insulation element, the heat insulation element is arranged between the movable contact and the movable contact bracket.

The present disclosure further provides a contactor, which includes the movable contact bracket assembly as described above.

BRIEF DESCRIPTION OF THE DRAWINGS

The advantages and objectives of the present disclosure can be better understood from the following preferred embodiments of the present disclosure described in detail with the attached drawings. In order to better show the relationship of the components in the drawings, the drawings are not drawn to scale. In the attached drawings.

DETAILED DESCRIPTION

Figure 1:
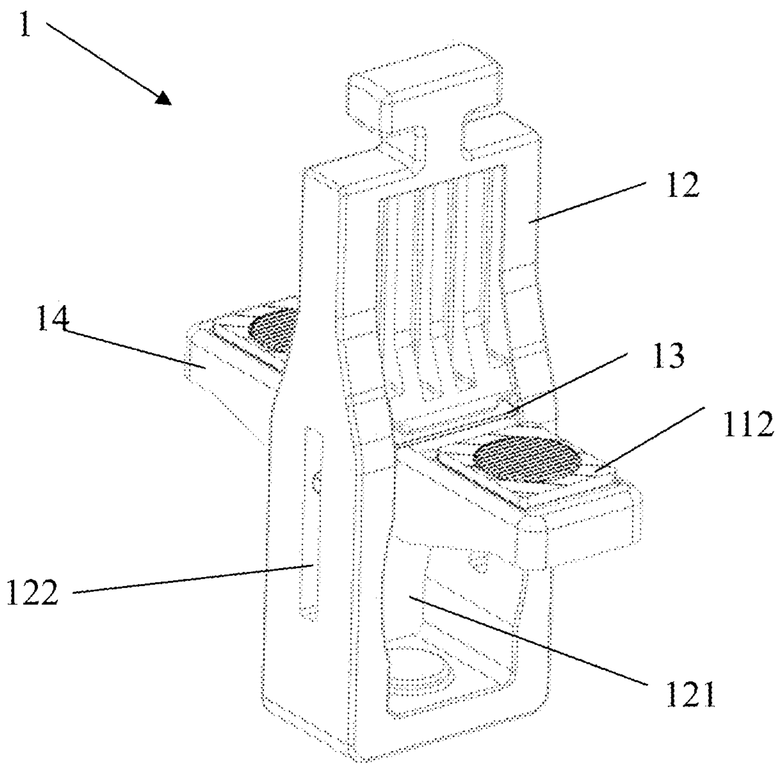
FIG. 1 shows a perspective view of a movable contact bracket assembly according to the first embodiment of the present disclosure.

Various embodiments according to the present disclosure will be described in detail with reference to the drawings. Herein, it should be noted that, in the drawings, the same reference numerals are given to components that basically have the same or similar structures and functions, and repeated descriptions about them will be omitted. The term "including A, B, C, etc. in turn" only indicates the arrangement order of included components A, B, C, etc., and does not exclude the possibility of including other components between A and B and/or between B and C. The description of "first" and its variants is only to distinguish the components, and does not limit the scope of the present disclosure. Without departing from the scope of the present disclosure, the "first component" can be written as "second component" and so on. In this specification, the descriptions of "bottom" and "top" are involved, where the "top" of the movable contact refers to a side of the movable contact facing the stationary contact, and the "bottom" of the movable contact refers to a side of the movable contact away from the stationary contact.

The drawings in this specification are schematic diagrams, which assist in explaining the conception of the present disclosure and schematically show the shapes of various parts and their relationships.

Hereinafter, referring to FIGS. 1 to 6, the preferred embodiment of the present disclosure is described in detail.

Figure 2:
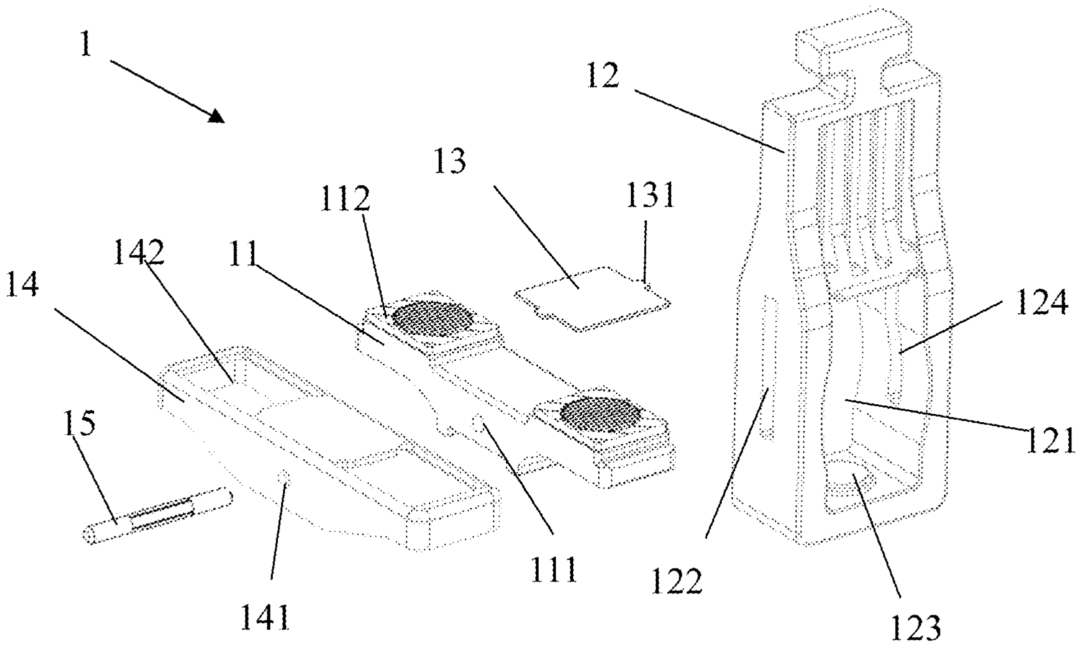
FIG. 2 shows an exploded view of the movable contact bracket assembly according to the first embodiment of the present disclosure.

FIGS. 1 and 2 respectively show a perspective view and an exploded view of a movable contact bracket assembly 1 according to the first embodiment of the present disclosure. The movable contact bracket assembly 1 includes a movable contact 11 and a movable contact bracket 12, and the movable contact 11 is installed on the movable contact bracket 12.

The movable contact bracket assembly 1 further includes a heat insulation element 13 disposed between the movable contact bracket 12 and the movable contact 11. The heat insulation element 13, such as but not limited to Normax paper, is flat in the drawings, but may have other shapes. The heat insulation element may be provided with protrusions 131 protruding from both sides, for example, for installing to the movable contact bracket. Of course, the heat insulation element may be installed to the movable contact bracket

12 by other suitable means. The heat insulation element avoids the direct contact between the movable contact bracket and the movable contact at high temperature, thus reducing the heat transfer from the movable contact to the movable contact bracket and the risk of the movable contact bracket breaking due to high temperature.

Figure 3:
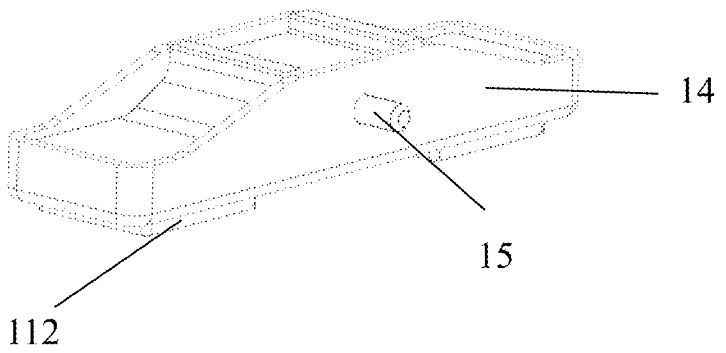
FIG. 3 shows a perspective view of the movable contact and the magnetic conductive frame installed together according to the first embodiment of the present disclosure.

The movable contact bracket assembly also includes a magnetic conductive frame 14. In the examples of FIGS. 1 to 3, the contour of the magnetic conductive frame 14 is configured to match the contour of the movable contact, so as to partially surround the movable contact 11 to protect the movable contact from arc erosion. As illustrated by FIG. 3, the bottom of the magnetic conductive frame (that is, a side away from the stationary contact) is open, that is, the magnetic conductive frame does not surround the bottom of the movable contact. The magnetic conductive frame includes a first through hole 141, and the movable contact includes a second through hole 111. When the magnetic conductive frame and the movable contact are installed, the first through hole and the second through hole are aligned, and a guide shaft 15 passes through the first through hole and the second through hole (for example, through interference fit) to connect the magnetic conductive frame and the movable contact.

The magnetic conductive frame 14 also includes an opening 142, preferably two openings 142 located at both ends of the magnetic conductive frame. In the case where the magnetic conductive frame surrounds the movable contact, two contacts 112 of the movable contact respectively extends through the two openings 142 by a predetermined distance, the predetermined distance is a distance from a top surface of the contact to the opening and is selected to facilitate guiding the arc generated upon the movable contact and the stationary contact being separated from each other from the movable contact to the magnetic conductive frame. Preferably, the predetermined distance is about 3 mm, for example. In this way, through the predetermined distance, it is convenient for the arc generated upon the movable contact and the stationary contact being separated to be guided from the contact of the movable contact to the magnetic conductive frame, thus avoiding the stagnation of the arc.

The movable contact bracket is provided with a convex column 123, which is used to install a pressure spring (not shown) between the movable contact bracket and the movable contact, so that one end of the pressure spring abuts against the convex column and the other end of the pressure spring abuts against the movable contact, thereby being able to press the movable contact and the magnetic conductive frame against the movable contact bracket.

The movable contact bracket 12 is provided with an opening 121 for receiving the movable contact, the magnetic conductive frame and the pressure spring. In addition, the movable contact bracket also includes a first guide slot 122 and a second guide slot 124. In the case where the movable contact and the magnetic conductive frame are connected by the guide shaft and accommodated in the opening 121, the guide shaft passes through the first guide slot and the second guide slot, so that the guide shaft can move in the first guide slot and the second guide slot. Through the cooperation of the guide shaft with the first guide groove and the second guide groove, the movable contact can be guided to move towards the stationary contact, and the alignment between the movable contact and the stationary contact can be ensured.

Figure 4:
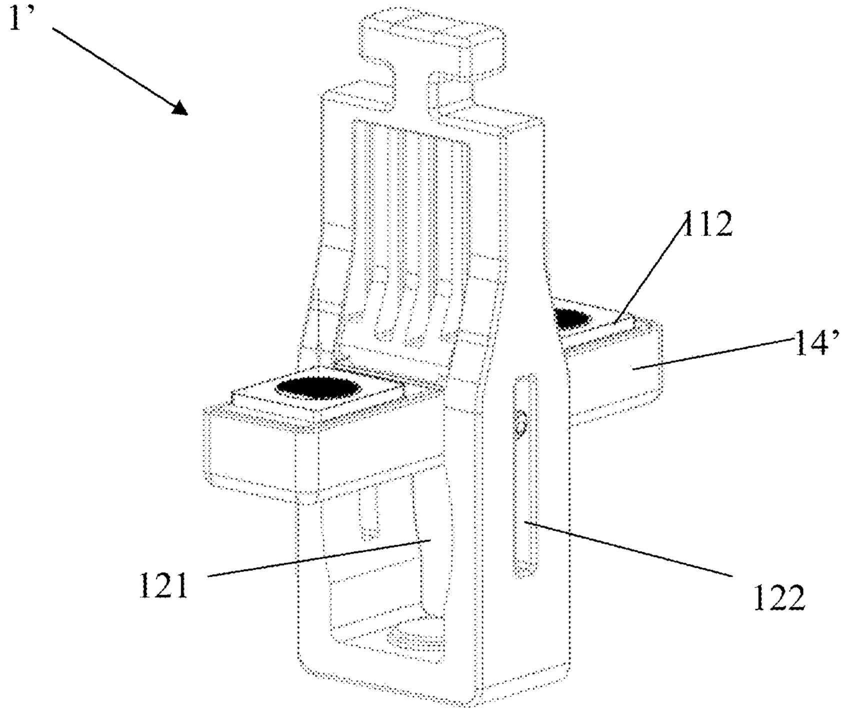
FIG. 4 shows a perspective view of a movable contact bracket assembly of the second embodiment of the present disclosure.
Figure 5:
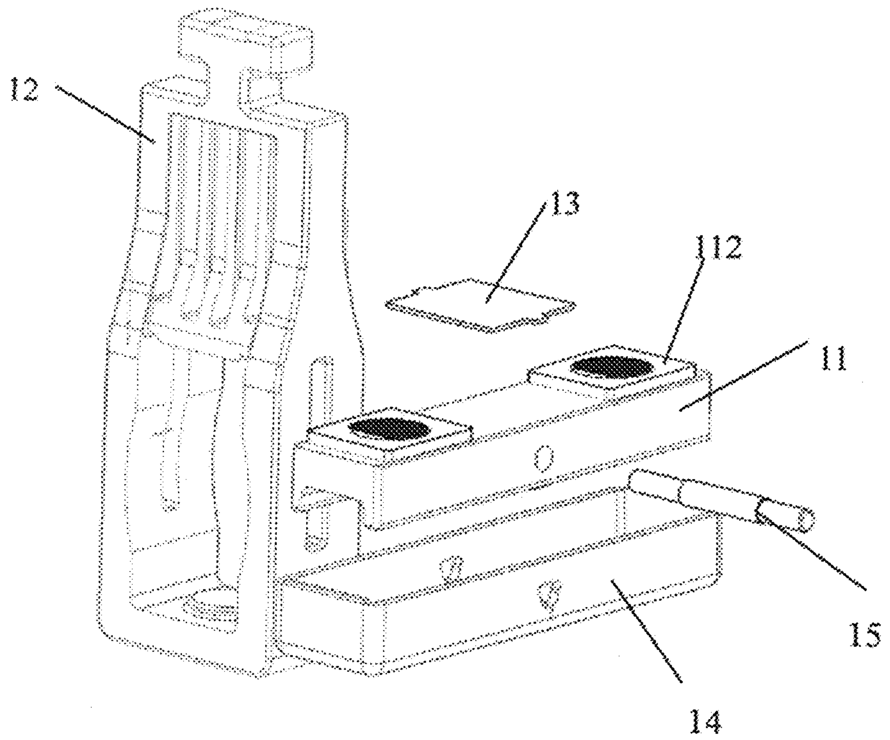
FIG. 5 shows an exploded view of the movable contact bracket assembly according to the second embodiment of the present disclosure.
Figure 6:
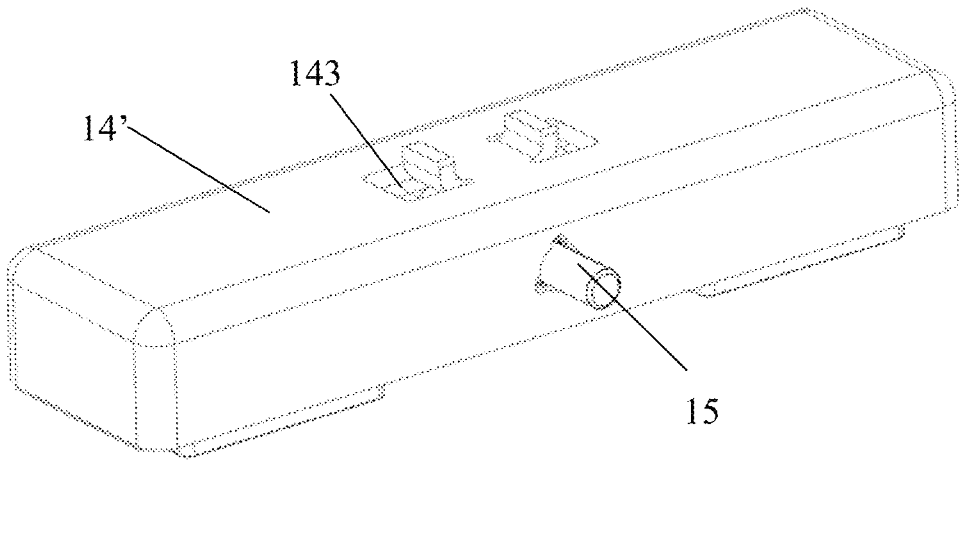
FIG. 6 shows a perspective view of the movable contact and the magnetic conductive frame installed together according to the second embodiment of the present disclosure.

FIGS. 4 and 5 respectively show a perspective view and an exploded view of the movable contact bracket assembly 1' according to the second embodiment of the present disclosure. The movable contact bracket assembly 1' of the second embodiment is basically the same as the movable contact bracket assembly 1 of the first embodiment, so the same components are denoted by the same reference numerals, and the description will not be repeated. The second embodiment is different from the first embodiment in that the bottom of the magnetic conductive frame 14' of the movable contact bracket assembly 1' of the second embodiment is closed, so that the magnetic conductive frame 14' surrounds all parts of the movable contact except the contacts of the movable contact. As illustrated by FIG. 6, in order to reduce the weight of the magnetic conductive frame 14', the bottom of the magnetic conductive frame 14' has a notch 143'. Two notches are shown in FIG. 6, but the number of notches is not limited thereto.

The movable contact bracket assembly according to the present disclosure is described above. The movable contact is at least partially surrounded by the magnetic conductive frame to protect the movable contact from arc. The contact of the movable contact extends a small distance from the opening of the magnetic conductive frame, which is convenient for the arc to be guided from the contact of the movable contact to the magnetic conductive frame, and then to the arc extinguishing device for arc extinguishing. Through the guide shaft and the guide groove on the movable contact bracket, the movable contact can be guided to move, thus reducing the heat generation.

Moreover, the technical features disclosed above are not limited to the disclosed combination with other features, and the skilled in art can also make other combinations among the technical features according to the purpose of the present disclosure, so as to realize the purpose of the present disclosure.

The invention claimed is:

1. A movable contact bracket assembly, comprising a movable contact and a movable contact bracket, wherein the movable contact bracket assembly further comprises a magnetic conductive frame which is configured to at least partially surround the movable contact to protect the movable contact from arc erosion, a contour of the magnetic conductive frame is configured to match a contour of the movable contact to at least partially surround the movable contact, the magnetic conductive frame comprises an opening, and a contact of the movable contact extends through the opening by a predetermined distance, and the predetermined distance is selected to facilitate guiding an arc generated upon the movable contact and a stationary contact being separated from each other from the movable contact to the magnetic conductive frame.

2. The movable contact bracket assembly according to claim 1, wherein the magnetic conductive frame completely surrounds all portions except the contact of the movable contact.

3. The movable contact bracket assembly according to claim 2, wherein the magnetic conductive frame comprises a notch to reduce a weight of the magnetic conductive frame.

4. The movable contact bracket assembly according to claim 1, wherein the magnetic conductive frame comprises a first through hole, the movable contact comprises a second through hole, and a guide shaft passes through the first through hole and the second through hole to connect the magnetic conductive frame and the movable contact.

5. The movable contact bracket assembly according to claim 4, wherein the movable contact bracket comprises a guide groove along which the guide shaft can move.

6. The movable contact bracket assembly according to claim 1, wherein the movable contact bracket assembly further comprises a heat insulation element which is arranged between the movable contact and the movable contact bracket.

7. A contactor, wherein the contactor comprises the movable contact bracket assembly according to claim 1.

* * * * *